United States Patent Office 3,224,104
Patented Dec. 21, 1965

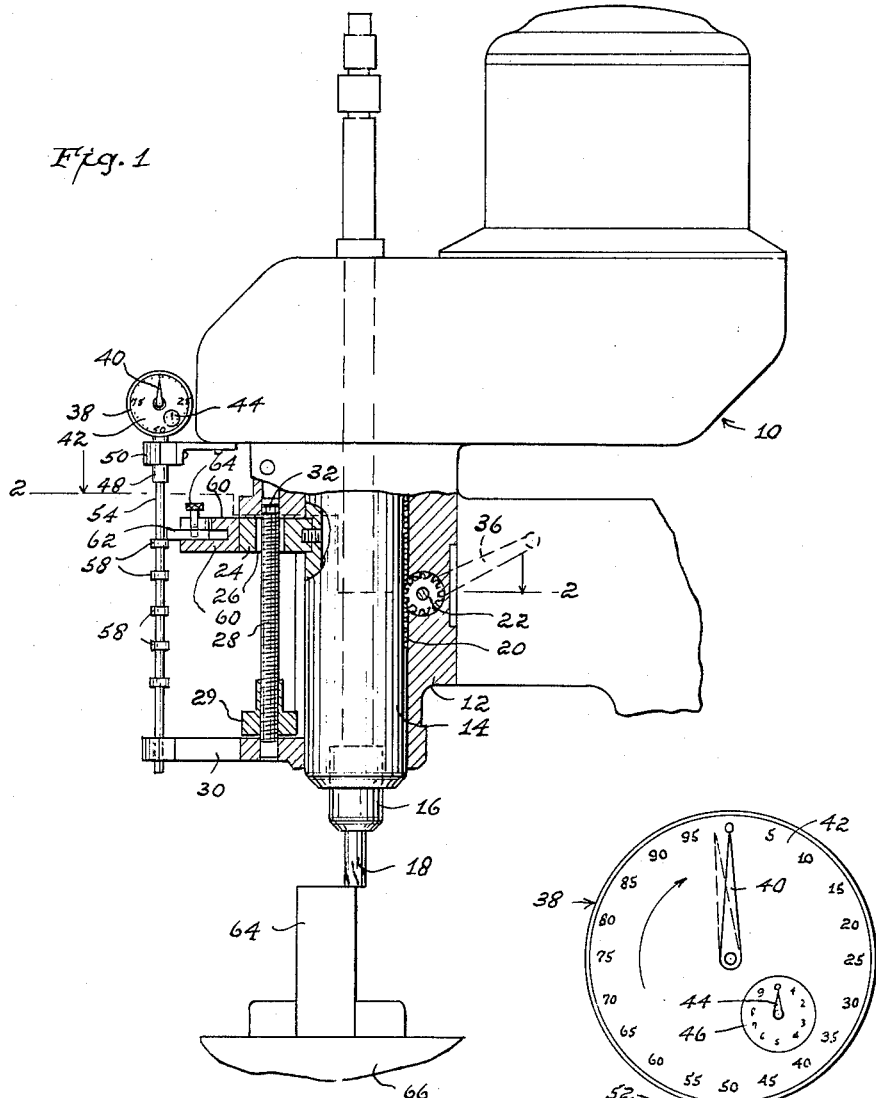
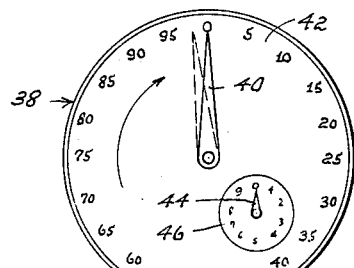
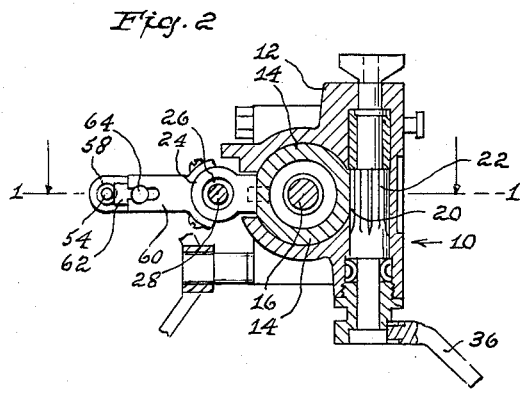
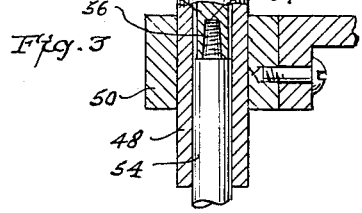
Robert E. Platt II
INVENTOR.

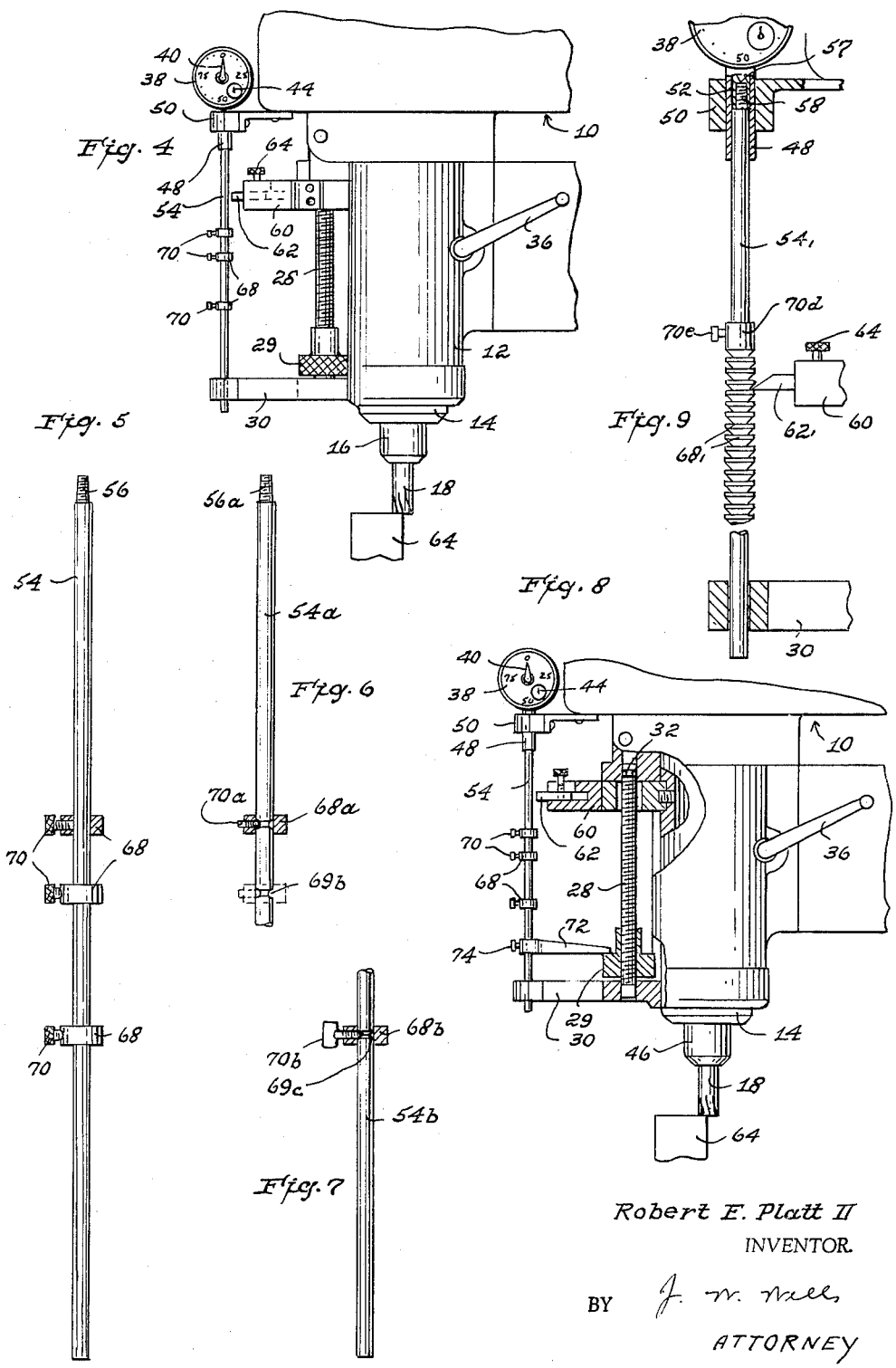

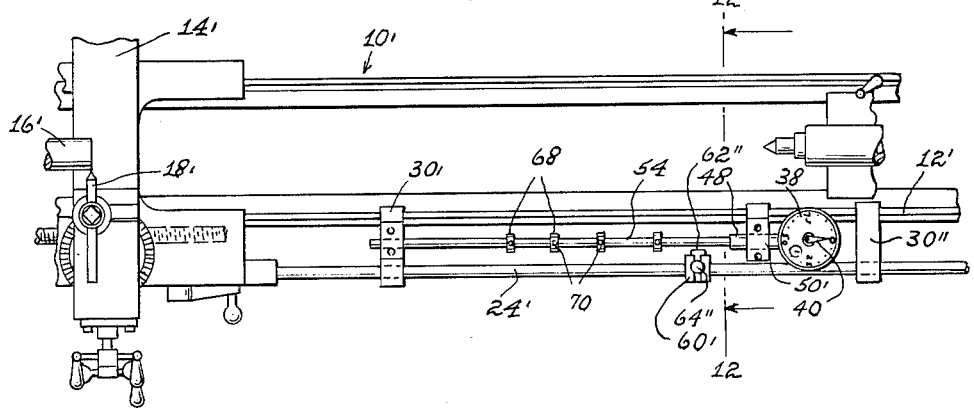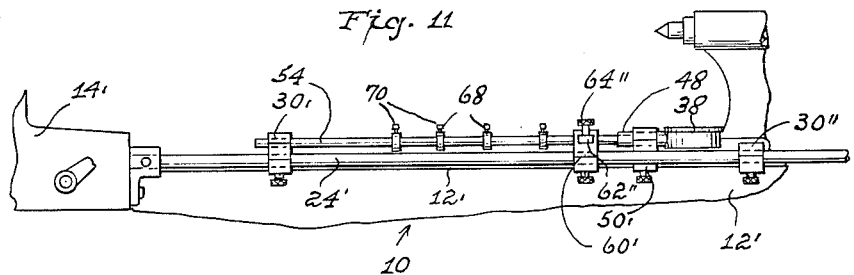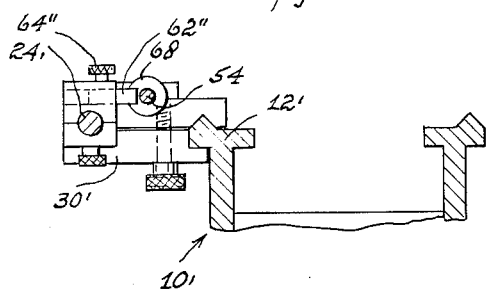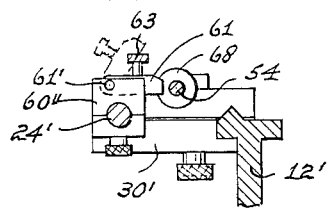
Robert E. Platt II
INVENTOR.
ATTORNEY

3,224,104
DIAL INDICATOR GAUGING ATTACHMENT
Robert E. Platt II, R.D. 1, near Riegelsville, Pa.
Filed Feb. 17, 1964, Ser. No. 345,181
2 Claims. (Cl. 33—172)

This invention relates to devices for gauging the linear travel of machine components, such as cutting tools, work or tool supporting carriages and the like; and one of the principal objects of the present invention is to provide a gauging device for attachment to a stationary portion of a machine, said device including a dial indicator of the type having a reciprocative needle actuating stem and means cooperative with said indicator for gauging predetermined lengths of linear travel of a cutting tool, carriage or other movable component of the machine.

Another object of this invention is to provide a multiple gauging device or machine attachment of the character referred to, including inexpensive, interchangeable gauging rods or bars and having means for attaching them to the outer end of the reciprocative stem of a dial indicator of the type mentioned, said rod or bar having thereon a collar or a plurality of collars or other abutments cooperative with a finger carried by a cutting tool or other movable component of a machine for effecting axial movement of the rod and thereby actuating the indicator needles in physically and visually gauging the lengths of linear working travel of the tool or other machine component.

A further object of the present invention is to provide a multiple linear gauging attachment of the character mentioned in which the collars, or other abutments on the gauging rod may be integral with the rod or bar in spaced relation according to lengths of travel of a tool or other machine component in performing its required work, or in which the abutments may be adjustable on the rod.

Another object of the invention is to provide a multiple linear gauging attachment for a conventional type of milling machine having a micrometer screw and adjustable nut for effecting disengagement of the quill feed at a predetermined end of a cut or other length of work, this attachment employing a gauging rod or bar having thereon either a plurality of spaced abutments cooperative with the dial indicator and a retractable finger carried by the movable machine component as already mentioned, or a single collar having means for selectively spacing it thereon, the rod or bar having thereon a second finger which may be locked on the rod in a position for abutting relation with the micrometer nut, or unlocked and rotated out of the path of said nut. With this attachment a number of predetermined or required lengths of travel of the milling or boring tool can be gauged and the quill feed automatically disengaged at the end of each operation without the necessity of adjusting the micrometer for each of the different lengths of travel of the tool as in present machines of the type referred to.

A still further object of this invention is to provide a multiple linear gauging attachment for the carriage of a lathe or similar machine, in which the general arrangement is the same as hereinbefore mentioned.

It should be understood that the linear dial indicator employed in this invention is of a special conventional design obtainable in the market, and in which the large or primary indicator needle is rotated by a rack and pinion assembly actuated by a reciprocative stem projecting radially from the indicator casing and through which the indicator needle makes a specific number of revolutions for a certain unit of linear measurement, as, for example, 10 revolutions for a linear measurement of one inch. It is provided also with means for automatic stopping of rotation of the primary needle at the end of the last of the cycle of revolutions and for automatically returning this needle to zero on the dial when the reciprocative stem is relieved of the applied force causing its outward axial movement. Such an indicator is also provided with a smaller auxiliary dial and a needle actuated through the same reciprocative stem for indicating the individual revolutions of the large, or primary, needle or fractions of rotations, and for automatically returning it to zero on the auxiliary dial.

In one form of the present invention, a dail indicator of the type mentioned is fixedly attached to the staionary base of a machine having a tool or carriage movably mounted thereon; an elongated rod or bar having thereon a plurality of collars, or other abutments, is attached to the outer end of the reciproctive stem of the dial indicator; and a retractable finger is attached to the tool quill or other movable member of the machine for selective abutting relation with either of the abutments on the elongated rod, the abutments being spaced according to predetermined lengths of travel of the tool or other machine component, or spaced according to the length of the work to be done. With this arrangement the operator will retract the finger at the end of each length of travel of the tool or carriage and place it in the path of the next one of the abutments. If fractional gauging is required at the end of a plurality of lengths of travel, the operator will be visually guided by the indicator needles and dials, assuming that the linear travel of the quill is manually controlled by the operator.

One form of the present invention is especially adaptable to a conventional milling machine having a micrometer screw and nut actuated by the quill travel for disengaging the quill feed mechanism at a predetermined length of movement. In this arrangement the retractable finger is attached to the quill in right angular relation and another finger is mounted on the elongated rod in right angular relation for abutment with the micrometer nut to disengage the quill feed mechanism. This arrangement enables the operator to gauge as many lengths of cut of the tool as there are collars or abutments on the elongated rod without the necessity of adjusting the micrometer nut for each cut, as previously required.

As heretofore mentioned, the gauging rod may be provided with only a single collar, instead of a plurality of collars by forming a desired plurality of grooves or notches in the bar at correctly spaced intervals and providing the collar with a spring urged detent for engagement with either of the successive grooves, the detent having sufficient strength to actuate the indicator needles, but also sufficient yieldability to enable the operator to push it down into snap engagement of the detent in the next groove after completion of a cut. With this type of collar the finger for abuting engagement with the collar need not be retractable. Also, a thumb set-screw in the collar for engagement with either of the notches may be substituted for the detent.

A particular advantage of the present invention resides in the fact that the elongated rods with a plurality of collars, or other abutments spaced as desired, either integrally or adjustably, or rods having grooves and a single collar shiftable to successive grooves, are so inexpensive that they can be conveniently stored for use in repetitious jobs of the same nature; and they can be adapted to any type of machine having a movable operating member.

Other objects and advantages of my improved gauging device will be apparent or pointed out in the following specification in which reference is had to the accompanying drawings forming a part thereof and in which:

FIG. 1 is a side elevation, partly in section, of a portion of a milling machine having attached thereto one form of gauging device in accordance with the present invention;

FIG. 2 is a section taken generally on the line 2—2 of FIG. 1;

FIG. 3 is an enlarged detail view showing one conventional form of dial indicator employed in combination with the present invention;

FIG. 4 is a side elevation of a portion of a milling machine, similar to FIG. 1, but showing a different application of the gauging rod;

FIG. 5 is a detail view of the gauging rod shown in FIG. 4;

FIG. 6 is a detail partial view of another form of gauging rod in accordance with this invention;

FIG. 7 is a detail partial view of still another form of gauging rod in accordance with the invention;

FIG. 8 is a view of a portion of a milling machine similar to FIG. 4, but partly in section and showing a different application of the gauging rod;

FIG. 9 is a detail view showing a modified form of gauging rod;

FIG. 10 is a plan view of a lathe with the present invention applied thereto;

FIG. 11 is a side elevation of the assembly shown in FIG. 9;

FIG. 12 is a transverse section taken on the line 12—12 of FIG. 10; and

FIG. 13 is a detail view similar to FIG. 12 but showing a modified form of retractable finger.

Referring to the drawings in which like numerals designate like parts or elements in the several views, and referring first to FIGS. 1 to 3, the numeral 10 designates a milling machine having a base portion 12 in which a tool quill 14 is mounted for axial but non-rotatable movement. A spindle 16 for supporting a tool 18 is journaled in the quill 14 in rotatable but axially non-movable relation therewith. The quill has axial feed rack teeth 20 in its rear surface actuated by a pinion 22 connected with a feed mechanism (not shown). An arm 24 is attached to the front portion of the quill in right angular relation thereto. Through an opening 26 in this arm projects a micrometer screw 28 non-rotatably but slidably mounted at its lower end in a bracket 30 projecting laterally from the base 12 and in engagement at its upper end with a lever 32 (shown in endwise relation), which lever is connected with the quill feed mechanism, referred to above, for automatically disengaging this mechanism at the end of a predetermined stroke of the quill 14. A micrometer nut 29 is adjustably mounted on the screw 28, but neither the screw nor nut is used in connection with the application of the multiple gauging attachment now to be described; and in its use the rack and pinion quill feed is operated only manually, by means of a handle 36.

A conventional reciprocative type dial indicator 38 adaptable to this invention having a primary indicator needle 40 rotatable around its dial 42 and a secondary needle 44 rotatable around its smaller dial 46 has an elongated radially extending sleeve 48 which is rigidly mounted in a bracket 50 attached to the machine base 10. A reciprocative stem 52 (FIG. 3) projects through the sleeve 48 and into connection with rack and pinion elements (not shown) for actuating the indicator needles 40 and 44. A conventional dial indicator of the type illustrated is so designed that a full revolution of the primary needle will represent a definite unit of measurement, such, for example, as one inch for a certain number of revolutions, say ten revolutions for one inch of axial travel of the stem 52. Such an indicator has means for stopping rotation of the needle at the precise point of the last revolution of a cycle indicating a linear travel of exactly one inch of the stem 52. The dial of this indicator is graduated into fractions of an inch, say one thousandths. The secondary needle 44 indicates the individual rotations of the primary needle.

Therefore, an operator desiring a linear cut of 550 thousandths inch can observe the secondary needle 44 for 5 revolutions of the primary needle 40 and then finish the gauging by visually observing the movement of the primary needle 40.

The multiple gauging attachment shown in FIG. 1 includes an elongated rod or bar 54 for insertion in the sleeve 48 and has a threaded end 56 for coengagement with a threaded socket 57 in the outer end of the stem 52, its other end having a slidable bearing in the outer end of the bracket 30. As illustrated in FIG. 1, it is assumed that the indicator needle 40 has a total range of one inch in ten revolutions, and the abutments 58 are spaced precisely one inch apart. A slotted holder 60 for a retractable finger 62 is rigidly attached to the arm 24 (carried by the quill 14) in any suitable manner. This finger 62 is slidable in the holder by means of a knob 64, or other suitable means, into or out of abutting registry with the row of abutments 58 on the rod 54. Assuming that it is desired that the tool 18 make a cut of two inches plus five thousandth inch, after the finger 62 moved the first abutment 58 with rod 54 a distance of one inch the operator will retract it to permit the needles 40 and 44 to return to zero, thereby also retracting the rod 54 accordingly, thereby bringing the next lower abutment into abutting relation with the finger. After another full cycle of revolutions of the primary needle 40, the operator will again retract the finger, but will turn to the secondary dial and after it indicates two full revolutions of the primary needle 40 he will observe the graduations on the primary dial until the needle 40 indicates that the tool 18 has traveled an additional five thousandths inch, at which time the operator will manually and instantly stop the feed of the quill 14 and tool 18 by means of the handle 36.

The gauging rod 54a shown in FIG. 6, instead of having a plurality of collars, is provided with a plurality of spaced grooves 69b and a single collar 68a having a spring urged detent 70a which, when snapped into engagement in either of the grooves has sufficient strength to actuate the needles of the indicatior 38 under force of the retractable finger 62, but has sufficient yieldability to enable the operator to push the collar down into engagement of the detent in the next lower groove. However, because of this yieldability it is not necessary that the finger 62 be retractable, as when cooperating with a plurality of fixed collars or abutments on the gauging rod.

The gauging rod shown in FIG. 7 also requires only a single collar 68b having a plurality of V-shaped grooves 69c in which a thumb-screw 70b in the collar can be inserted in either of the grooves 69c without retracting the finger 62.

Therefore, it will be seen that it is necessary for the finger 62 to be retractable only when there is a plurality of fixed collars or integral abutments on the gauging rod 54.

With the above described arrangement the feed is started with the finger 62 in abutting contact with the uppermost of the abutments 58. Thus, when a work piece 64 is raised by the work support 66 into contact with the end of the tool 48 a slight pressure on the handle 36 of the manual feed will cause a correspondingly slight backward movement of the primary needle 40, as indicated in broken lines in FIG. 3, assuring the operator that the finger 62 is in contact with the uppermost abutment 58 on the rod 54, and that the working linear travel of the tool 48 will be precisely indicated on the dials of the indicator.

The form of the invention shown in FIGS. 4 and 5 is the same as that of FIG. 1, except that the abutments on the rod 54 are in the form of collars 68 held in spaced relation on the rod by means of the set-screws 70. If desired, the set-screws may be made of nylon, so that in the event of slipping they will not mar the surface of the rod.

The milling machine 10 shown in FIG. 8 may be identical with that shown in FIGS. 1 and 4. Also the rod or bar 54 and the abutment collars 68 may be the same as shown in FIG. 4; but a second finger 72 is slidably mounted on the rod 54 and adjustably held in fixed relation thereon by a set-screw 74 with its free end in a position for abutting engagement with the micrometer nut 29, so that the micrometer screw 28 will be slightly moved downwardly upon abutting impact of the retractable finger on either of the collars 68, thereby actuating the lever 32 to disengage the quill feed mechanism (not shown).

The differences in the functioning of the gauging elements, as shown in FIGS. 1, 4 and 7 are as follows:

In the arrangement shown in FIG. 1 the abutments 58 may be formed integrally with the rod or bar 54 and spaced according to the measurement range of the dial indicator 38, that is, assuming that the range is one inch the abutments are spaced one inch apart. It will be seen that the retractable finger 62 is in contact with the uppermost abutment 58 on the rod 54. The work piece 64 has been raised by manual operation of the hand feed handle 36 into contact with the end of the cutting tool 18. A slight pressure on the handle 36 causes a corresponding backward movement of the primary indicator needle 40, as shown in broken lines in FIG. 3, thus assuring the operator that the working travel of the tool will be precisely indicated on the indicator dial. Since a full revolution of the needle 40 represents only 1/10 inch, the slight backward movement, or flicker, of the needle has no appreciable effect on the gauging function.

In the working operation, the quill 14, fed manually by means of the handle 36, will move downwardly together with the retractable finger 62, which remains in contact with the uppermost abutment 58, thereby forcing downward movement of the rod 54, which is attached to the reciprocative needle actuating stem (FIG. 3), until the end of the last cycle of rotation of the needle, when it will be automatically stopped by means (not shown) in the indicator. The tool 18 will then have traveled precisely one inch, assuming that one inch is the range of the indicator. A skilled operator will sense the end of the cycle and will relax the manual quill feed to prevent damage to the gauging elements. He will then retract the finger 62 from contact with the collar 58, whereupon the needle 40 will be automatically returned to zero by means (not shown) in the indicator, thereby bringing the next lower collar 58 up into abutting relation with the finger 62. As the tool 18 travels farther into the work all the collars 54 may be utilized in the manner described. However, if it is predetermined that the length of travel of the tool at any time should be less than the distance between the abutments 54, the operator will visually gauge the manual feed of the quill by observing the primary and auxiliary indicator dials until the required length of tool travel has been reached.

The machine, gauging elements and operation of the assembly shown in FIG. 4 may be identical with those of FIG. 1, except for a different arrangement of the abutments on the rod 54, which are designated as slidably adjustable collars 68 held in fixed position on the rod by set-screws 70. In this arrangement the indicator needle 40 is actuated only slightly at the end of a predetermined length of travel of the tool 18, for visual observance by the operator. The distance between the retractable finger 62 and the first collar 68 represents the length of the first cut of the tool. The operator, while manually feeding the quill 14 will visually observe the indicator dial 38 and when the finger 62 comes into contact with the first collar he will note a slight movement of the needle 40 and instantly stop the feed. He will then retract the finger 62, start the feed again and after the finger 62 has passed the first collar he will again extend it to a position in abutting registry with the next collar 68. As many of these collars can be placed on the rod 54 as may be required for a number of successive cuts, and in any required spaced relation.

The machine and gauging elements of the assembly shown in FIG. 8 may be identical with that of FIG. 4 except with the addition of the second finger 72 which, in cooperative relation with the micrometer screw 28 and nut 29 renders the disengagement of the quill feed mechanism through the lever 32 automatic at the end of a predetermined length of travel of the tool 18, when the retractable finger 62 comes into abutment with either of the collars 68. The micrometer nut can be left in one position on the screw 28, thereby eliminating the necessity of adjusting it during any multiple gauging procedure, in which as many collars 68 as required for such gauging can be adjustably attached to the rod 54.

In FIG. 9 is shown a form of gauging rod 54, having a plurality of equally spaced integral abutments 68' useful in certain milling machine operations. It is provided with a threaded end for attachment to the end of the reciprocative needle actuating stem 52 in the same manner as that of the rod 54. The abutments 68' are closely spaced and tapered downwardly to faciliate abutting engagement with a retractable finger 62' having a tapered end. The abutments 68' may be made integral with the rod 54' or with a tubular member 70d held on the rod by a set-screw 70e.

The gauging elements shown in FIGS. 10 to 12, including the dial indicator 38, gauging rod 54, and collars or other abutments 68 may be the same as shown in previous views, but are shown as attached to a lathe 10' for gauging the linear working travel of the lathe carriage 14' instead of a milling machine quill. As shown in FIGS. 10 to 12, the dial indicator 38 is fixedly attached to the lathe base or bed 12' by means of a clamp 50' with the gauging rod 54, having thereon the collars 68, or other abutments, slidably mounted at its free end in a bearing 30' attached to the lathe bed. A holder 60' for a retractable finger 62" is attached to the lathe carriage 14' through an elongated bar 24' to the outer end of which the holder is rigidly secured with the finger in a position for abutting relation with either of the collars 68 when in extended relation with the holder. The bar 24' is rigidly attached at its other end to the carriage 14'. This bar is slidably mounted in the bearing 30' and also in another bearing 30", both of which may be attached to the lathe bed 12' in longitudinally adjustable relation therewith.

With the lathe tool 18', the work piece 16', the rod 54, and the collars 68 in the relations shown in FIGS. 10 and 11, the gauging procedure is similar to that in the milling machine assembly shown in FIG. 4, in which the dial indicator needle is rotated only slightly upon each contact of the finger 62", as a visible reminder to to operator that a required length of cut has been reached, so that he can retract the finger 62" to permit its passage to the next collar 68 in the multiple gauging procedure. However, it is believed to be obvious that the collars can be arranged as shown in FIG. 1, so that the indicator needles will rotate in accordance with movements of the retractable finger 62" when effecting movement of the rod 54 by abutment with the respective collars 68; also that either of the gauging rod and collar arrangements previously described is adaptable to a lathe, planer, or the like.

In FIG. 13 is shown a form of holder 60" having a retractable finger 61 which is pivotally mounted in the holder, as indicated at 61', and is provided with a lifting knob 63 to facilitate retracting it out of abutting relation with the collars 68.

From the foregoing description it will be seen that I have developed an efficient and economical multiple gauging attachment, applicable to various types of machines for accurate gauging of the linear travel of movable working components.

Obviously, various changes or modifications may be made in my improved gauging attachment without departing from the spirit or scope of my invention. Therefore, it should be understood that the embodiments of my invention shown and described are intended to be illustrative only, and restricted only by the appended claims.

I claim:

1. In a machine having an elongated stationary base, an elongated quill mounted thereon in longitudinally movable relation therewith, said quill having an operating spindle mounted therein in rotatable but axially fixed relation therewith, said machine also having a lever for disengaging its axial quill feed means, and including a micrometer screw rotatably mounted on said base in longitudinal relation with said quill with one end of said screw in actuating relation with said lever and its other end slidably mounted on said base, said screw having a micrometer nut mounted thereon; means for actuating said quill feed disengaging lever at a predetermined point in operative travel of said quill comprising, in combination, a dial indicator having a reciprocative actuating stem and means for rigidly attaching said indicator to said base with said stem in longitudinal relation with said base, quill and spindle, an elongated rod having means for attaching it at one end thereof to the outer end of said stem and for supporting it at its other end on said base in slidable relation therewith, said rod having a plurality of radially projecting abutments spaced thereon according to predetermined lengths of operative travel of said quill and spindle; a retractable finger having means for attaching it to said quill in a position for selective abutting relation with either of the abutments on said rod for effecting outward axial movement of said indicator actuating stem; and another finger having means for fixedly mounting it on said rod with the free end of said finger in abutting relation with said micrometer nut for effecting a slight axial movement of the micrometer screw to actuate said quill feed disengaging means.

2. Quill feed disengaging means as in claim 1 in which the finger for abutment with the micrometer nut is rotatably mounted on the rod attached to the indicator stem, said finger being provided with a set-screw for locking it on said rod either in or out of position for abutting relation with said micrometer nut.

References Cited by the Examiner

UNITED STATES PATENTS

| | | | |
|---|---|---|---|
| 2,131,973 | 10/1938 | Rusnak | 77—63 |
| 2,236,881 | 4/1941 | Rusnak | 77—4 X |
| 2,385,874 | 10/1945 | Metro | 33—170 |
| 2,440,710 | 5/1948 | Bauer | 33—170 |
| 2,701,418 | 2/1955 | Steinburg | 33—172 |
| 2,768,445 | 10/1956 | Vavrinek | 33—172 X |
| 2,914,856 | 12/1959 | Fitzpatrick | 33—125 |
| 2,916,828 | 12/1959 | Wait | 33—147 |
| 3,050,859 | 8/1962 | Wojcik | 33—172 |
| 3,100,406 | 8/1963 | Knosp | 33—125 |
| 3,115,708 | 12/1963 | Roy | 33—169 |

FOREIGN PATENTS

| | | |
|---|---|---|
| 882,127 | 2/1943 | France. |
| 339,643 | 7/1921 | Germany. |
| 556,856 | 10/1943 | Great Britain. |
| 248,842 | 2/1948 | Switzerland. |

S. S. MATTHEWS, *Examiner.*

ISAAC LISANN, *Primary Examiner.*